(12) United States Patent
Chen et al.

(10) Patent No.: US 10,379,840 B2
(45) Date of Patent: Aug. 13, 2019

(54) CROWD SOURCING ACCESSIBILITY RENDERING SYSTEM FOR NON-ACCESSIBLE APPLICATIONS

(71) Applicant: International Business Machines Corporation, Armonk, NY (US)

(72) Inventors: Sharon Chen, New Taipei (TW); Louis Huang, Taipei (TW); Gary Lin, New Taipei (TW); Pei-Yi Lin, New Taipei (TW); Jin Shi, Ningbo (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/788,525

(22) Filed: Oct. 19, 2017

(65) Prior Publication Data

US 2019/0121633 A1    Apr. 25, 2019

(51) Int. Cl.
*G06F 9/44* (2018.01)
*G06F 8/656* (2018.01)
*G06F 9/445* (2018.01)

(52) U.S. Cl.
CPC .......... *G06F 8/656* (2018.02); *G06F 9/44526* (2013.01)

(58) Field of Classification Search
CPC ..... G06F 8/00; G06F 8/10; G06F 8/65; G06F 8/656; G06F 9/44526; G06F 9/44536; G06F 9/451

(Continued)

(56) References Cited

U.S. PATENT DOCUMENTS

| 8,260,903 B2 * | 9/2012 | Ganesh .................. G06Q 30/02 709/223 |
| 8,732,661 B2 | 5/2014 | Brown et al. |

(Continued)

OTHER PUBLICATIONS

Brady et al., "Crowdsourcing Accessibility: Human-Powered Access Technologies", 2014, Foundations and Trends in Human-Computer Interaction, vol. 8, No. 4, pp. i-iii, 273-372. (Year: 2014).*

(Continued)

*Primary Examiner* — Ted T. Vo
(74) *Attorney, Agent, or Firm* — Amin, Turocy & Watson, LLP

(57) ABSTRACT

Techniques facilitating a crowd-sourcing accessibility rendering system for non-accessible applications are provided. A system can comprise a memory that stores computer executable components and a processor that executes the computer executable components stored in the memory. The computer executable components can comprise an interaction component that monitors one or more interactions between one or more entities and a defined application. The computer executable components can also comprise an analysis component that determines accessibility related information associated with the defined application based on received feedback from an entity of the one or more entities. Further, the computer executable components can comprise an adjustment component that creates a modified application based on the one or more interactions and the accessibility related information of the defined application. The defined application is a non-disability accessible application and the modified application is a disability accessible application.

20 Claims, 12 Drawing Sheets

(58) Field of Classification Search
USPC .............. 717/106–107, 124–128, 168–173
See application file for complete search history.

(56) References Cited

U.S. PATENT DOCUMENTS

| | | | |
|---|---|---|---|
| 9,361,887 B1* | 6/2016 | Braga | .................. H04W 4/21 |
| 9,665,547 B1 | 5/2017 | Eidelson et al. | |
| 2002/0118223 A1 | 8/2002 | Steichen et al. | |
| 2006/0139312 A1 | 6/2006 | Sinclair, II et al. | |
| 2008/0184104 A1 | 7/2008 | Karle et al. | |
| 2014/0180846 A1 | 6/2014 | Meron | |
| 2014/0289217 A1* | 9/2014 | Werkema | .......... G06F 17/30867 707/710 |
| 2015/0019954 A1 | 1/2015 | Dalal et al. | |
| 2017/0108935 A1* | 4/2017 | Ricci | ...................... H04W 4/21 |
| 2017/0162076 A1* | 6/2017 | Kanuganti | ........... G09B 21/001 |

OTHER PUBLICATIONS

Bigham et al., "The Design of Human-Powered Access Technology", 2011, ACM, pp. 3-10. (Year: 2011).*

Kittur et al., "Crowdsourcing User Studies With Mechanical Turk", 2008, ACM, pp. 453-456. (Year: 2008).*

Burton et al., "Crowdsourcing Subjective Fashion Advice Using VizWiz: Challenges and Opportunities", 2012, ACM, 8 pages. (Year: 2012).*

Calle-Jimenez et al., "Using Crowdsourcing to Improve Accessibility of Geographic Maps on Mobile Devices," The Eighth International Conference on Advances in Computer-Human Interactions, 2015, pp. 150-154, IARIA, 5 pages.

"Visual impairment and blindness," World Health Organization, Aug. 2014, 4 pages. Retrieved on Aug. 1, 2017. http://www.who.int/mediacentre/factsheets/fs282/en/.

"Accessibility," 2016, W3C, 5 pages. Retrieved on Aug. 1, 2017. https://www.w3.org/standards/webdesign/accessibility.

"WAI—ARIA Overview," 2016, W3C, 7 pages. Retrieved on Oct. 4, 2017. https://www.w3.org/WAI/intro/aria.

Mell et al., "The NIST Definition of Cloud Computing," National Institute of Standards and Technology, Sep. 2011, 7 pages, Special Publication 800-145, U.S. Department of Commerce.

* cited by examiner

US 10,379,840 B2

CROWD SOURCING ACCESSIBILITY RENDERING SYSTEM FOR NON-ACCESSIBLE APPLICATIONS

BACKGROUND

The subject disclosure relates to a crowd-sourcing accessibility rendering system for non-accessible applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate using crowd-sourcing accessibility rendering for non-accessible application are provided.

According to an embodiment, a system can comprise a memory that stores computer executable components and a processor that executes the computer executable components stored in the memory. The computer executable components can comprise an interaction component that monitors one or more interactions between one or more entities and a defined application. The computer executable components can also comprise an analysis component that determines accessibility related information associated with the defined application based on received feedback from an entity of the one or more entities. Further, the computer executable components can comprise an adjustment component that creates a modified application based on the one or more interactions and the accessibility related information of the defined application. The defined application can be a non-disability accessible application and the modified application can be a disability accessible application.

According to another embodiment, a computer-implemented method can comprise monitoring, by a system operatively coupled to a processor, one or more interactions between one or more entities and a defined application. The computer-implemented method can also comprise determining, by the system, accessibility related information associated with the defined application based on received feedback from an entity of the one or more entities. Further, the computer-implemented method can comprise creating, by the system, a modified application based on the one or more interactions and the accessibility related information of the defined application. The defined application can be a non-disability accessible application and the modified application can be a disability accessible application.

According to a further embodiment, a computer program product that facilitates rendering a non-disability accessible application in a disability accessible format can be provided. The computer program product can comprise a computer readable storage medium having program instructions embodied therewith, the program instructions can be executable by a processing component to cause the processing component to monitor one or more interactions between one or more entities and a defined application. The program instructions can also cause the processing component to determine accessibility related information associated with the defined application based on received feedback from an entity of the one or more entities. Further, the program instructions can cause the processing component to create a modified application based on the one or more interactions and the accessibility related information of the defined application. The defined application can be the non-disability accessible application and the modified application can be a disability accessible application.

DETAILED DESCRIPTION

Figure 1:
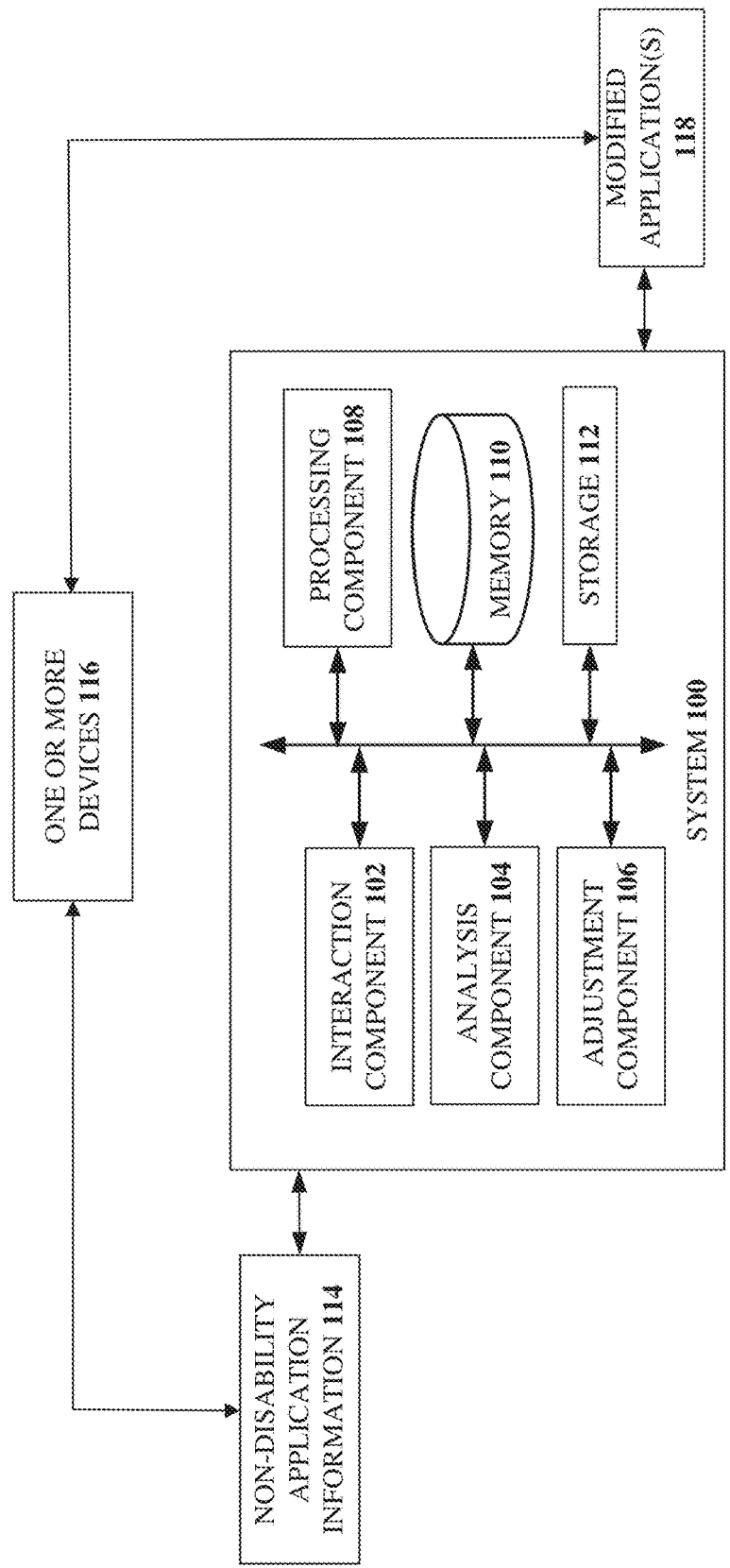
FIG. 1 illustrates a block diagram of an example, non-limiting system that facilitates crowd-sourcing accessibility rendering for non-accessible applications in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Estimations are that there are two hundred and eighty-five million (285,000,000) visually impaired people worldwide. Thirty-nine million (39,000,000) people are blind and two hundred and forty-six million (246,000,000) people have low vision and experience some form of disability. Many of these people, to interact with computing devices, utilize accessibility technologies. Accordingly, various websites and applications should be accessibility enabled, which involves determining (and at times guessing) what features should be accessibility enabled.

The various aspects provided herein utilize crowd-sourcing accessibility rendering systems to render a website(s) and/or application(s) from a non-accessible format to an accessible format. For example, the various aspects can monitor interactions and/or collect feedback from information provided by devices associated with non-disabled users in order to dynamically transform the non-accessible format of the website/application to an accessible format. According to some implementations, a proxy server can be utilized to render the non-accessible website/application into an accessible website/application.

Embodiments described herein comprise systems, computer-implemented methods, and computer program products that can utilize crowd-sourcing as an accessibility rendering system for non-accessible websites and/or applications. Specifically, one or more of the various aspects can monitor interactions of devices associated with experienced users and collect feedback from the devices on a specific website/application to generate recommended accessible operations for the devices associated with the disabled users. For example, as discussed herein, the various aspects can attach a proxy server to an application server to transform the original application to a more accessible application based on recommended accessible operations generated while monitoring and/or collecting feedback.

Thus, as will be discussed in further detail below, interactions of devices associated with experienced non-disabled users can be monitored and feedback can be collected, from the devices, on a defined application. Based on the monitored interactions and/or feedback, recommended accessibility operations for devices associated with the disabled users can be generated. According to some implementations, a proxy server can be attached to an application server (for the defined application) and the original application (e.g., the non-disability accessible application) can be transformed to a more accessible application based on the recommended accessibility operations for devices associated with disabled users. As such, accessibility related functionality of a computing system and/or efficiency of a computing system for devices utilized by disabled users can be improved. Furthermore, performance of a processor associated with a disability accessible computing system can be improved, efficiency of a processor associated with a disability accessible system can be improved, and/or another characteristic of a processor associated with a disability accessible computing system can be improved.

FIG. 1 illustrates a block diagram of an example, non-limiting system 100 that facilitates crowd-sourcing accessibility rendering for non-accessible applications in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can be a computing system associated with technologies such as, but not limited to, word processing technologies, Internet browsing technologies, computing technologies, artificial intelligence technologies, medicine and materials technologies, supply chain and logistics technologies, financial services technologies, and/or other digital technologies. The system 100 can employ hardware and/or software to solve problems that are highly technical in nature (e.g., analyze information from a multitude of different devices that have traversed non-disability accessibility websites and/or applications, determine a navigation order utilized by the multitude of different devices to develop a recommended navigation order for a disability accessibility website and/or application), that are not abstract and that cannot be performed as a set of mental acts by a human. Further, in certain embodiments, some of the processes performed can be performed by one or more specialized computers (e.g., one or more specialized processing units, a specialized computer with an accessibility rendering computing component, etc.) to carry out defined tasks related to machine learning for rendering a website and/or application, programmed in a non-disability accessible format, as a disability accessible website and/or application.

The system 100 and/or components of the system 100 can be employed to solve new problems that arise through advancements in technologies mentioned above, computer architecture, and/or the like. One or more embodiments of the system 100 can provide technical improvements to computing systems, processor systems, artificial intelligence systems, and/or other systems. One or more embodiments of the system 100 can also provide technical improvements to an accessibility rendering processor by improving processing performance of the processor, improving processing efficiency of the processor, improving processing characteristics of the processor, improving timing characteristics of the processor, and/or improving power efficiency of the processor. For example, processing efficiencies can be achieved based on rendering non-accessible websites/applications as accessible websites/applications based on utilization of a proxy server, a non-intrusive form, and/or through other transformative systems and/or methods as discussed herein. In the embodiment shown in FIG. 1, the system 100 can comprise an interaction component 102, an analysis component 104, an adjustment component 106, a processing component 108, a memory 110, and/or a storage 112. The memory 110 can store computer executable components and instructions. The processing component 108 (e.g., a processor) can facilitate execution of the instructions (e.g., computer executable components and corresponding instructions) by the interaction component 102, the analysis component 104, the adjustment component 106, and/or other system components. As shown, in some embodiments, one or more of the interaction component 102, the analysis component 104, the adjustment component 106, the processing component 108, the memory 110, and/or the storage 112 can be electrically, communicatively, and/or operatively coupled to one another to perform one or more functions of the system 100.

The interaction component 102 can receive, as input data, one or more non-disability application information 114. The one or more non-disability application information 114 can include information related to interactions that comprise information output from devices 116 associated with non-disabled users with various websites and/or applications. The non-disabled users can be users that have previously interacted, through respective computing devices (e.g., the devices 116), with the websites and/or applications (e.g., experienced users). The various websites and/or applications can be non-accessible websites and/or non-accessible applications. For example, the non-disability application information 114 can be a machine-readable description of the interactions.

The interactions can be a template for one or more interactions associated with disability-accessible websites and/or disability-accessible applications. For example, navigation within the non-disability-accessible website by devices 116 associated with non-disabled users can be utilized as a template for facilitating navigation though the disability-accessible website by devices 116 associated with disabled users.

In one example, the non-disability application information 114 can include textual data indicative of a text-format language the describes interactions. For instance, the textual data can, for example, textually describe one or more interactions of a device associated with a non-disabled user, as provided by the devices 116 associated with the non-disabled users, and respective information associated with the websites and/or applications.

In one or more embodiments, the interaction component 102 can monitor the one or more non-disability application information 114 between one or more entities and a defined application (or website). The one or more entities can be the devices associated with non-disabled users (e.g., the devices 116). Further, the defined application can be an application under consideration. Further, although discussed with respect to an application, the disclosed aspects can also be utilized for websites and/or other forms of interaction between entities and computing systems. According to some implementations, the one or more interactions monitored by the interaction component 102 can comprise interactions selected from a group comprising a navigation within the defined application, a behavior associated with the defined application, and/or an external action associated with the defined application.

The analysis component 104 can determine accessibility related information associated with the defined application. For example, the analysis component 104 can determine the accessibility related information based on received feedback from an entity of the one or more entities. For example, the feedback can be solicited from the devices 116 through one or more feedback collection entry points that are provided within the defined application. The one or more feedback collection entry points can prompt feedback related to a current page being viewed, or other elements of the defined application. A user can interact with their respective device (e.g., a device of the devices 116) to facilitate entry of the feedback information.

As utilized herein an "entity" can be one or more computers, the Internet, one or more systems, one or more commercial enterprises, one or more computers, one or more machines, machinery, one or more actors, one or more users, one or more customers, one or more humans, and so forth, hereinafter referred to as an entity or entities depending on the context.

According to some implementations, the analysis component 104 can determine information of the defined application that should be utilized to create the modified application that comprises accessibility support. For example, the analysis component 104 can determine, based on feedback received, that a section of a web page should be completed in order for access to another page to be enabled. The noted section of the web page can be indicated by the analysis component 104 to be included in the modified application. Accordingly, the modified application can include one or more portions of the defined application.

One or more modified applications 118 can be created by the adjustment component 106. For example, based on the one or more interactions and the accessibility related information of the defined application, the adjustment component 106 can selectively transform a non-disability accessible application into a disability accessible application (e.g., a modified application). According to an implementation, the adjustment component 106 can create the modified application through use of a non-intrusive form. For example, the non-intrusive form can be a form through which the adjustment component 106 can apply an accessible attribute without changing the original web site/application directly. In an example, the adjustment component 106 can attach a proxy server to the application server to facilitate the transformation. In another example, the adjustment component 106 can use a browser plugin that can manipulate a rendered HTML page at run-time.

Further, the adjustment component 106 can update application code within the non-intrusive form in real-time (e.g., at the time the website/application is requested). In some implementations, the defined application is not changed by the adjustment component 106 when the modified application is created.

According to some implementations, the adjustment component 106 can attach a proxy server to the defined application to render the modified application. In an additional, or alternative implementation, the adjustment component 106 can implement a browser plug-in that manipulates a rendered hypertext mark-up language page of the defined application at run time.

In some embodiments, the adjustment component 106 can generate the one or more modified applications 116 based on classifications, correlations, inferences, and/or expressions associated with principles of artificial intelligence. For instance, the adjustment component 106, as well as other system components, can employ an automatic classification system and/or an automatic classification process to determine which features of a defined non-accessible application should be modified to create an accessible application. In one example, the adjustment component 106 can employ a probabilistic and/or statistical-based analysis (e.g., factoring into the analysis utilities and costs) to learn and/or generate inferences with respect to the respective interactions of devices associated with the non-disabled users (e.g., the devices 116) with the defined non-accessible application. In an aspect, the adjustment component 106 can comprise an inference component (not shown) that can further enhance automated aspects of the adjustment component 106 utilizing in part inference based schemes to facilitate learning and/or generating inferences associated with the interactions and changes that should be applied in order to render the defined non-accessible application as an accessible application. The adjustment component 106 can employ any suitable machine-learning based techniques, statistical-based techniques, and/or probabilistic-based techniques. For example, the adjustment component 106 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the adjustment component 106 can perform a set of machine learning computations associated with generation of an accessible application based on monitored interactions associated with a non-accessible application. For example, the adjustment component 106 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to transform the defined application into an application that comprises accessibility related features and functionality.

It is to be appreciated that the system 100 (e.g., the interaction component 102, the analysis component 104, and/or the adjustment component 106, as well as other system components) can perform crowd-sourcing and can monitor interactions of devices associated with abled/experienced users (e.g., the devices 116) with websites/applications and automatically collecting feedback that cannot be performed by a human (e.g., is greater than the capability of a single human mind). For example, one or more devices can be utilized to navigate non-disability accessible websites and/or applications and a navigation order of these devices within the websites and/or applications can be dynamically captured, wherein the devices can be located at disparate geographic locations. In another example, a non-intrusive form can be utilized to transform the non-disability websites and/or application into disability accessible websites and/or applications without changing the non-disability accessible websites and/or applications directly. In another example, a proxy server can be attached to an application server associated with the non-disability accessible websites and/or applications to facilitate the transformation. In another example, a browser plugin that can manipulate a rendered HTML page at run-time can be utilized to perform the transformation.

The interactions, navigation order, and/or application of the non-intrusive form, an amount of data processed, a speed of data processed and/or data types of data processed by the system 100 (e.g., the interaction component 102, the analysis component 104, and/or the adjustment component 106, as well as other system components) over a certain period of time can be greater, faster, and different than an amount, speed, and data type that can be processed by a single human mind over the same period of time. The system 100 (e.g., the interaction component 102, the analysis component 104, and/or the adjustment component 106, as well as other system components) can also be fully operational towards performing one or more other functions (e.g., fully powered on, fully executed, etc.) while also performing the above-referenced transformation of websites and/or applications without disability accessible functionality to websites and/or applications that comprise disability accessible functionality. Moreover, the one or more non-disability application information 114 monitored and coordinated by the system 100 (e.g., the interaction component 102) can include information that is impossible to obtain manually by a user. For example, a type of information included in the non-disability application information 114, a variety of information associated with the non-disability application information 114, and/or optimization of the non-disability application information 114 to generate and output the one or more modified applications 118 can be more complex than information that can be obtained manually and processed by a user.

Figure 2:
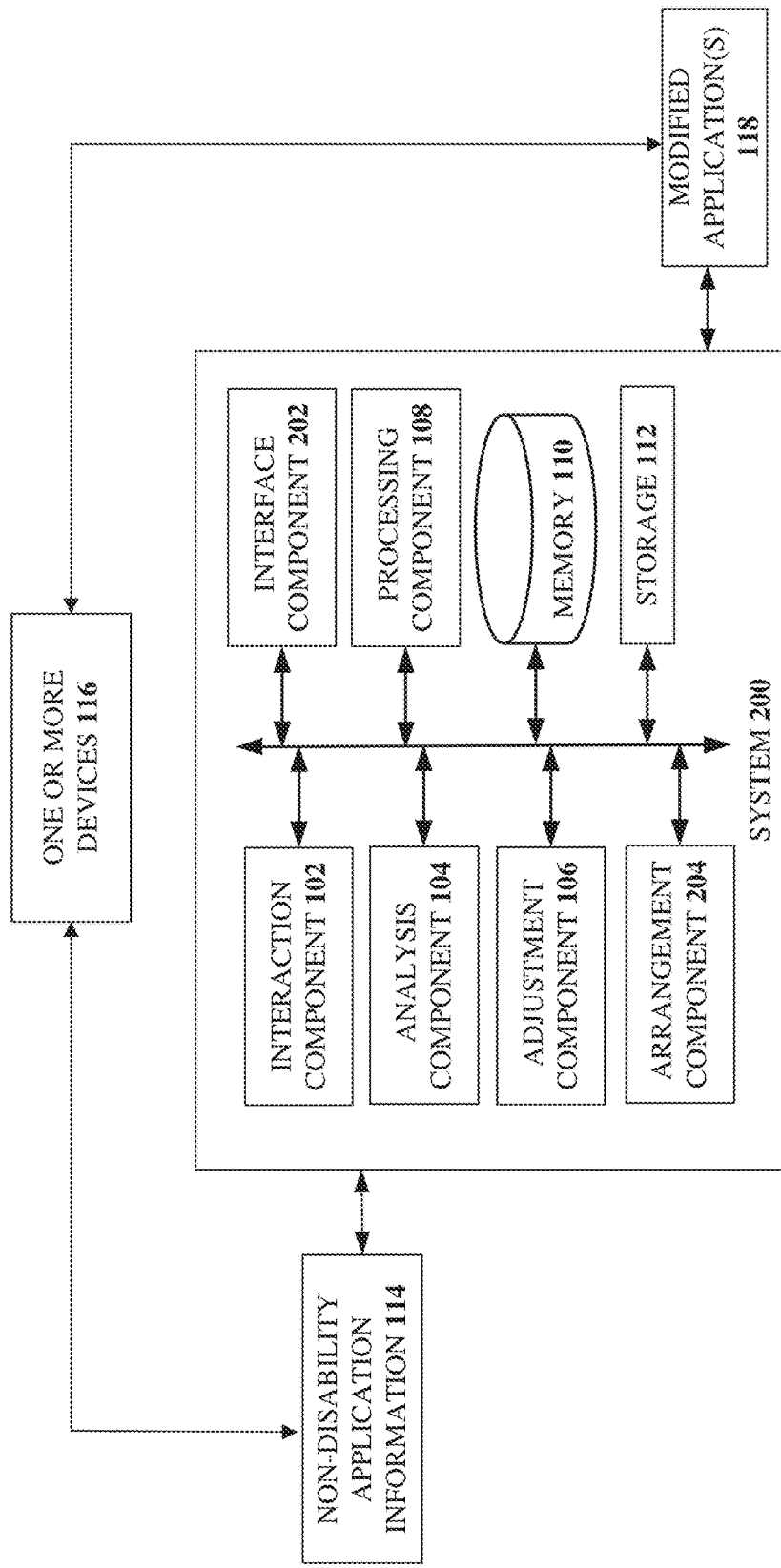
FIG. 2 illustrates a block diagram of an example, non-limiting system that determines navigation sequences of a defined application in accordance with one or more embodiments described herein.

FIG. 2 illustrates a block diagram of an example, non-limiting system 200 that determines navigation sequences of a defined application in accordance with one or more embodiments described herein. Repetitive description of like elements employed in other embodiments described herein is omitted for sake of brevity.

The system 200 can comprise one or more of the components and/or functionality of the system 100, and vice versa. The various aspects discussed herein can be utilized to render a website/application from a non-accessible format to an accessible format based on monitoring interactions and collecting feedback from devices associated with non-disabled users (e.g., the devices 116). The monitoring of interactions and collection of feedback can be based on a crowd-sourcing accessibility rendering system. The information monitored and collected can be applied to the original website/application in a non-intrusive form without changing the original website/application directly. Examples of the non-intrusive form include, but are not limited to, a proxy server, a web browser plugin, and/or another intermediate service layer.

For people with disabilities, accessibility technologies can be utilized to help them understand and use electronic content and applications. The disclosed aspects can automatically enable non-accessible websites and/or applications in an accessible format based on collecting feedback from a multitude of devices associated with non-disabled users, for example, and automatically applying information derived from that feedback to provide accessibility related functions for the websites and/or applications.

For example, an interface component 202 can receive a request from a device associated with a user that has been determined to use accessibility enabled features of websites and/or applications. For example, the interface component 202 can receive a request for a new page (e.g., a new web page) and also a request to access an accessibility proxy server. The request for the accessibility proxy server can be automatically sent by the device based on defined configurations of the device (e.g., a user associated the device previously indicated that accessibility functionality should be provided). Based on this request, it can be determined by the analysis component 104 that, instead of rendering the non-disability enabled website/application, the website/application should be transformed into a disability enabled website/application for rendering on the device.

Accordingly, the interaction component 102 can obtain the one or more non-disability application information 114 through monitoring the interaction between the devices 116 and the application. For example, the interaction component 102 can capture how, through respective devices (e.g., the devices 116), the users interact with an application User Interface (UI). The interaction with the UI can include recording keyboard strokes and/or mouse clicks, tracking eye movement, and observing other interactions. The interaction component 102 can capture the information through various means including, but not limited to, customer experience (CX) analysis applications.

An arrangement component 204 can analyze the one or more interactions for a navigation sequence. For example, the arrangement component 204 can monitor interactions of a non-disabled user and record information related to how the non-disabled user navigates through the website/application. For example, a first non-disabled user, though a first device, opens a first web page, and then navigates to a second webpage, which can be recorded by the arrangement component 204. Further, a second non-disabled user, through a second device, opens the web page and then also navigates to the second webpage, which can be recorded by the arrangement component 204. The arrangement component 204 can infer that since both the first device and the second device navigated the web pages in a similar manner, then this is the navigation order that should be facilitated for a device associated with a disabled user. It is noted that although only navigation by two devices was discussed in this example, the arrangement component 204 can evaluate navigation orders of a multitude of devices to determine the appropriate navigation order for the disabled user devices.

Further, the arrangement component 204 can derive a suggested navigation order that should be utilized for the disability accessible website and/or application. For example, the navigation can be based on how experienced users navigate through the website/application using their respective devices (e.g., the devices 116). Based on the navigation by the experienced users through their respective devices (e.g., the devices 116), it can be inferred by the arrangement component 204 that navigation by an entity requesting the disability accessible format would find it beneficial to navigate the website/application in a similar manner Continuing the above example, if many devices associated with non-disabled users traversed the web pages in a similar manner (e.g., opened a first page, navigated to a second page, and then navigated to a third page), it can be inferred by the arrangement component 204 that the devices associated with disabled users can be facilitated to navigate in a similar order. It is noted that the navigation from the first page, to the second page, and then to the third page, can be a different order than an order of navigation expected for the web pages (e.g., contemplated during an initial development of the web pages).

Based on this analysis, the adjustment component 106 can create at least a portion of the modified application based on the navigation sequence. According to an example, the adjustment component 106 can append HTML "tabindex" attributes to one or more different elements based on the navigation order derived by the arrangement component 204. Further, the interface component 102 can output the re-rendered user interface on the device (e.g., at least one device of the devices 116) for consumption by the disabled user.

According to some implementations, the interface component 202 (as well as other interface components discussed herein) can provide a graphical user interface (GUI), a command line interface, a speech interface, Natural Language text interface, and the like. For example, a Graphical User Interface (GUI) can be rendered that provides a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a system, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Figure 3:
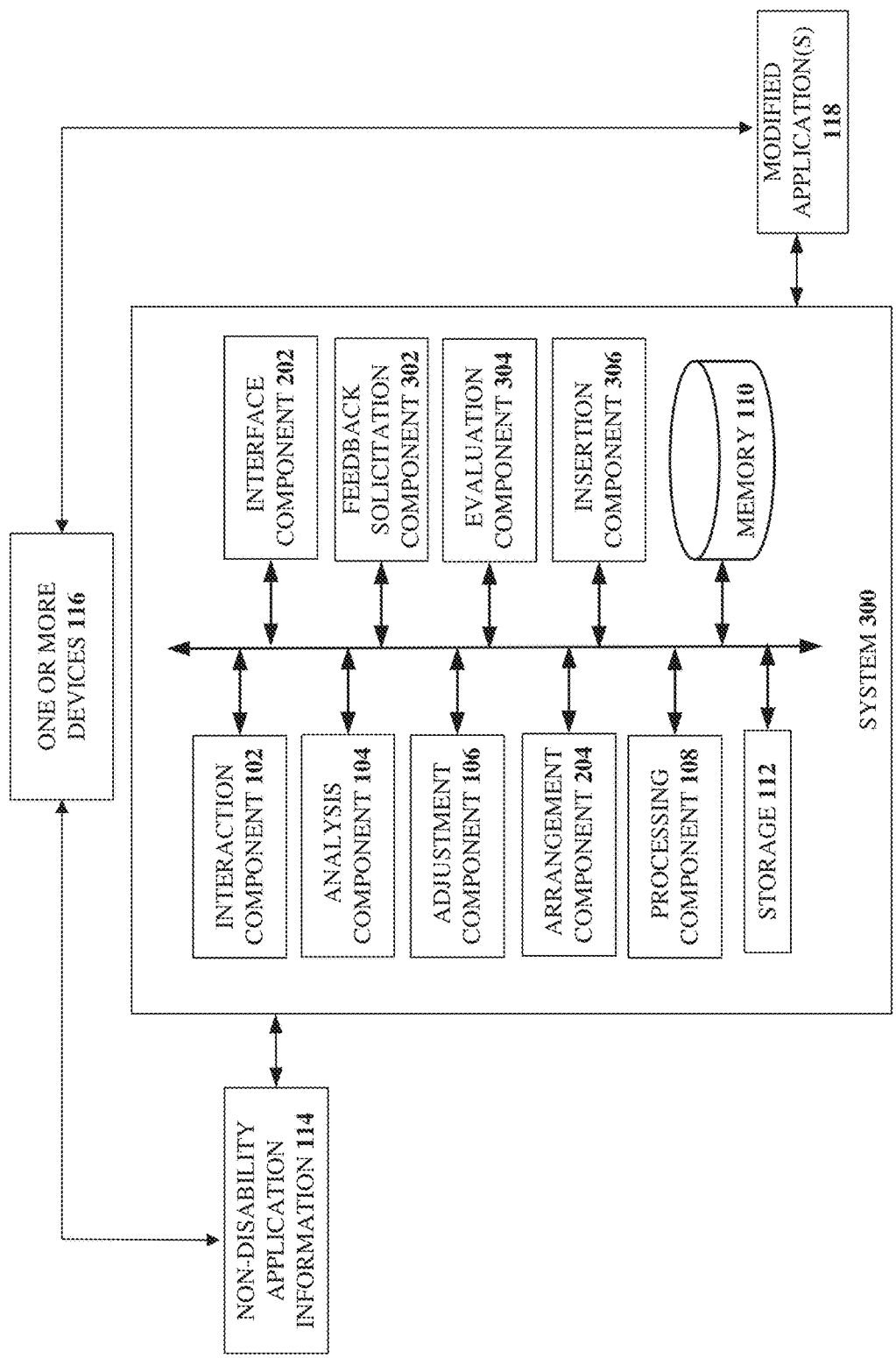
FIG. 3 illustrates a block diagram of an example, non-limiting system that determines accessibility related information through feedback in accordance with one or more embodiments described herein.

FIG. 3 illustrates a block diagram of an example, non-limiting system 300 that determines accessibility related information through feedback in accordance with one or more embodiments described herein. Repetitive description of like elements employed in other embodiments described herein is omitted for sake of brevity.

The system 300 can comprise one or more of the components and/or functionality of the system 100, the system 200, and vice versa. The system 300 can include a feedback solicitation component 302 that can append feedback collection entry points within the defined application. For example, the entity can provide feedback information based on an interaction with the defined application through the feedback collection entry points. The user, though the device (e.g., a device of the devices 116), can interact with the feedback collection entry points to indicate useful elements of the website/application and/or to provide additional information that can be useful to utilize the website/application.

In accordance with some implementations, the feedback solicitation component 302 can collect accessibility related information through feedback, which can be provided by the device (e.g., at least one device of the devices 116). For example, the feedback solicitation component 302 can determine what extra information would be needed for comprehensive accessibility support through various applications and/or accessibility assessment tools.

According to some implementations, an evaluation component 304 can derive the accessibility related information based on the feedback information. Further, an insertion component 306 can append an attribute to a user interface associated with the modified application. For example, the insertion component 306 can select the attribute from a group of attributes comprising a label of an input field and an alternative text string of an image.

For example, based on the information needs identified by the evaluation component 304, the insertion component 306 can append feedback collection entry points to elicit feedback, through the device (e.g., the devices 116), when providing the UI pages through respective devices (e.g., the devices 116). By way of example and not limitation, the insertion component 306 can highlight a specific area on a panel (e.g., a UI) and can provide a dialog window for an input of a label name though the device (e.g., at least one device of the devices 116).

In another example, based on feedback that is received from at least one device of the devices 116, the evaluation component 304 can collect and derive accessibility related information. Based on this information, the insertion component 306 can append various tags or attributes to the UI. For example, the insertion component 306 can label an input field, or can provide an "alternative text" string of an image, when re-rendering the UI.

According to some implementations, the adjustment component 106 can transform the original website/application through a non-intrusive form to an accessible website/application. For example, the non-intrusive form can be a form through which the adjustment component 106 can apply the accessible attribute without changing the original web site/application directly. In an example, the adjustment component 106 can attach a proxy server to the application server to facilitate the transformation. In another example, the adjustment component 106 can use a browser plugin that can manipulate the rendered HTML page at run-time. In yet another example, the adjustment component 106 can use other services that could serve as an intermediate layer between the source and the rendering module (e.g., the interface component 202) to facilitate the transformation.

Figure 4:
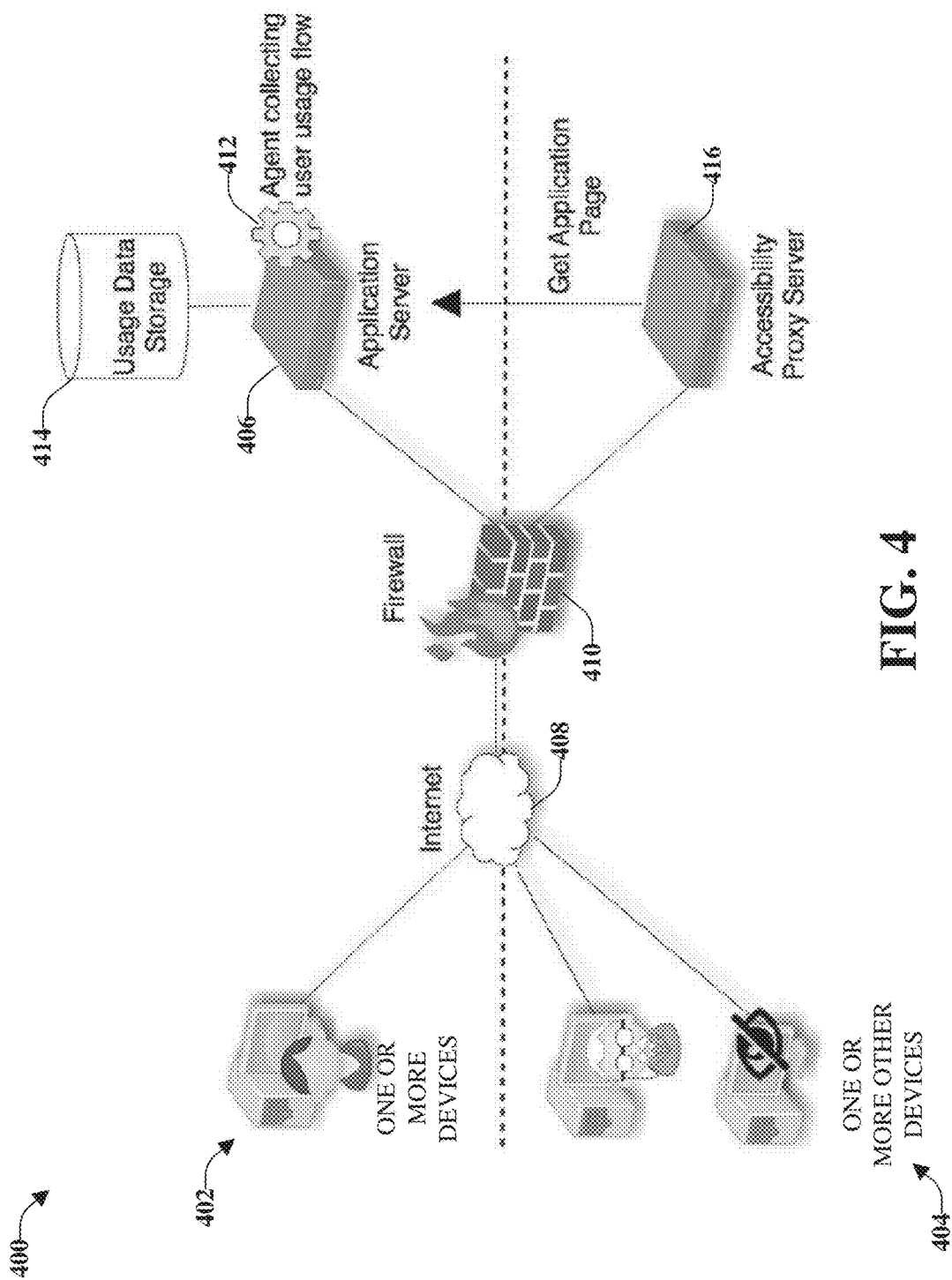
FIG. 4 illustrates an example, non-limiting system for rendering non-disability accessible computer programs in disability accessible formats in accordance with one or more embodiments described herein.

FIG. 4 illustrates an example, non-limiting system 400 for rendering non-disability accessible computer programs in a disability accessible format in accordance with one or more embodiments described herein. Repetitive description of like elements employed in other embodiments described herein is omitted for sake of brevity.

The system 400 can comprise one or more of the components and/or functionality of the system 100, the system 200, the system 300, and vice versa. As illustrated, one or more devices 402 (e.g., devices associated with non-disabled users) and one or more other devices 404 (e.g., devices associated with disabled users) can interface with the system 400. For example, the one or more devices 402 can interact with an application server 406 over the internet 408 (and through one or more firewalls 410). The application server 406 can include one or more agents 412 that can collect usage flow or navigation (e.g., as discussed with respect to the system 100, the system 200, and the system 300). Further, in some implementations, the usage by the one or more devices 402 can be retained in a usage data storage 414 (e.g., the storage 112). The one or more other devices 404 can interact with an accessibility proxy server 416 that can be accessed over the internet 408 (and through one or more firewalls 410).

In further detail, webpages can be rendered with assistive information. The other devices 404 can connect to the website through the accessibility proxy server 416. With the accessibility proxy server 416, the webpage can be rendered with the assistive information from data storage (e.g., usage data storage 414). Therefore, when a device of the one or more other devices 404 attempts to navigate the website, the device can receive additional support (e.g., tab index, information of required fields) to complete the operation. Alternatively, or additionally, non-necessary information can be hidden or masked for the disabled user associated with the device.

Accessibility tags can be collected automatically and applied to the one or more other devices 404. In some implementations, the accessibility tags can be improved and/or adjusted automatically and applied to the one or more other devices 404 as more information is obtained (e.g., by the interaction component 102). Further, there is no plugin or patch needed to enable the website/application in the disability accessible format. Instead, the one or more other devices 404 can simply add a proxy setting in a browser setting, according to some implementations.

Accordingly, the various aspects can provide a non-intrusive way to turn a non-accessible website into an accessible website. For example, the various aspects can leverage the observed experience of general (e.g., non-disabled and/or disabled) users, based on information received from devices associated with the users, as a guidance for accessibility tagging. Additionally, the various aspects can target on generating recommended accessible operations for a specific application by collecting the accessible interactions of other devices associated with experienced users, based on information received from their respective devices. The non-accessible website/application can be rendered as an accessible website/application based upon devices associated with the one or more disabled users accessing and interacting with the website/application. Thus, the disclosed aspects can be utilized with web applications that can have potential disabled users attempting to access the web applications through respective devices.

Figure 5:
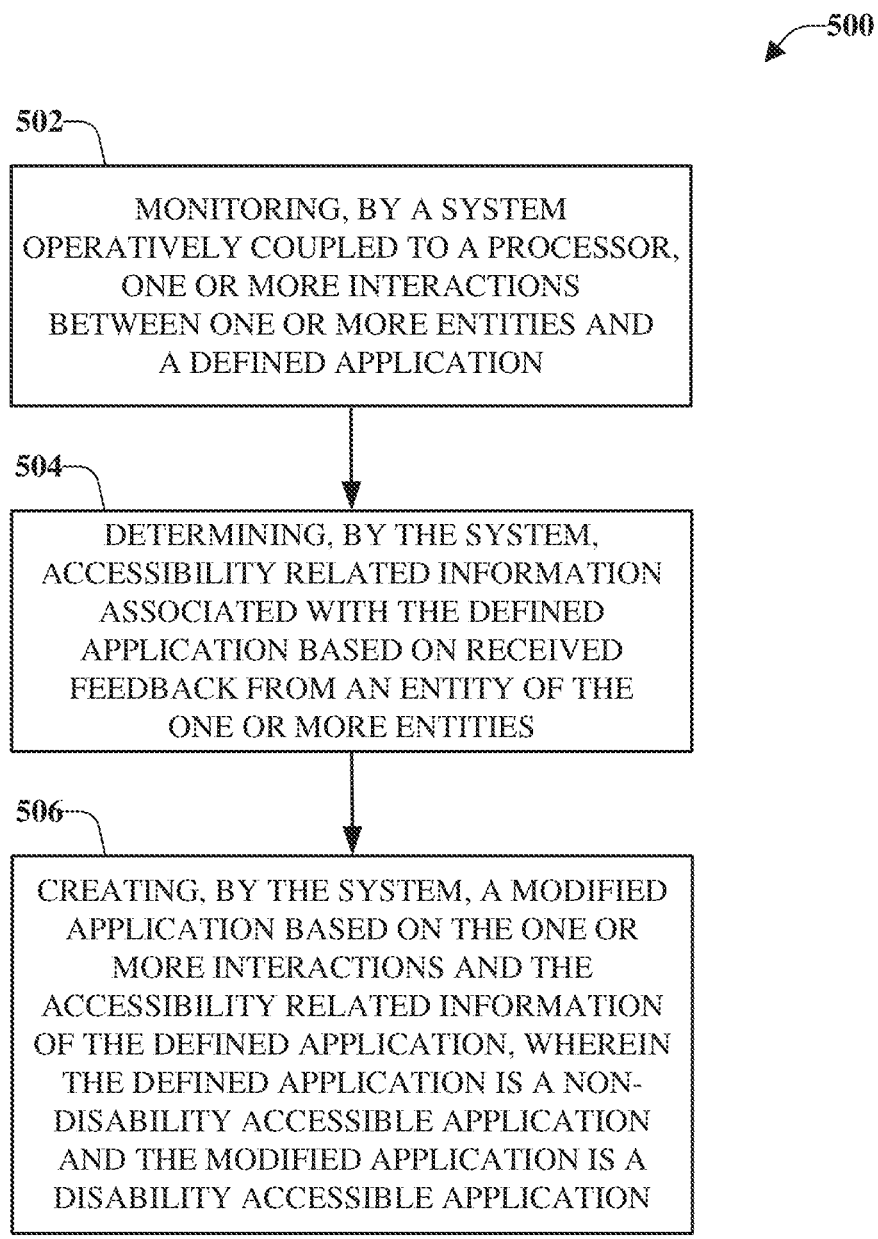
FIG. 5 illustrates a flow diagram of an example, non-limiting computer-implemented method that facilitates crowd-sourcing accessibility rendering for non-accessible applications in accordance with one or more embodiments described herein.

FIG. 5 illustrates a flow diagram of an example, non-limiting computer-implemented method 500 that facilitates crowd-sourcing accessibility rendering for non-accessible applications in accordance with one or more embodiments described herein. Repetitive description of like elements employed in other embodiments described herein is omitted for sake of brevity.

At 502 of the computer-implemented method 500, a system operatively coupled to a processor can monitor one or more interactions between one or more entities and a defined application (e.g., via the interaction component 102). For example, the one or more entities can be devices associated with non-disabled users and/or devices associated with users experienced (or that have previously interacted with) the website and/or application under evaluation. According to an example, monitoring the one or more interactions can include monitoring interactions selected from a group comprising a navigation within the defined application, a behavior associated with the defined application, and an external action associated with the defined application.

Accessibility related information associated with the defined application can be determined, at 504 of the computer-implemented method 500, based on received feedback from an entity of the one or more entities (e.g., via the analysis component 104). For example, the computer-implemented method 500 can include determining information to include in the defined application to create the modified application that comprises accessibility support.

Further, at 506, the computer-implemented method 500 can include creating, by the system, a modified application based on the one or more interactions and the accessibility related information of the defined application (e.g., via the adjustment component 106). The defined application can be a non-disability accessible application and the modified application can be a disability accessible application.

In some implementations, the defined application is not changed during the creation of the modified application. According to an example, the computer-implemented method 500 can include creating the modified application through use of a non-intrusive form. Application code within the non-intrusive form can be updated in real-time.

In accordance with some implementations, the computer-implemented method 500 can include analyzing, by the system, one or more interactions for a navigation sequence. Further to these implementations, the computer-implemented method 500 can include creating, by the system, at least a portion of the modified application based on the navigation sequence.

According to some implementations, the computer-implemented method 500 can include appending, by the system, feedback collection entry points within the defined application. For example, the entity can provide feedback information based on an interaction with the defined application through the feedback collection entry points.

Figure 6:
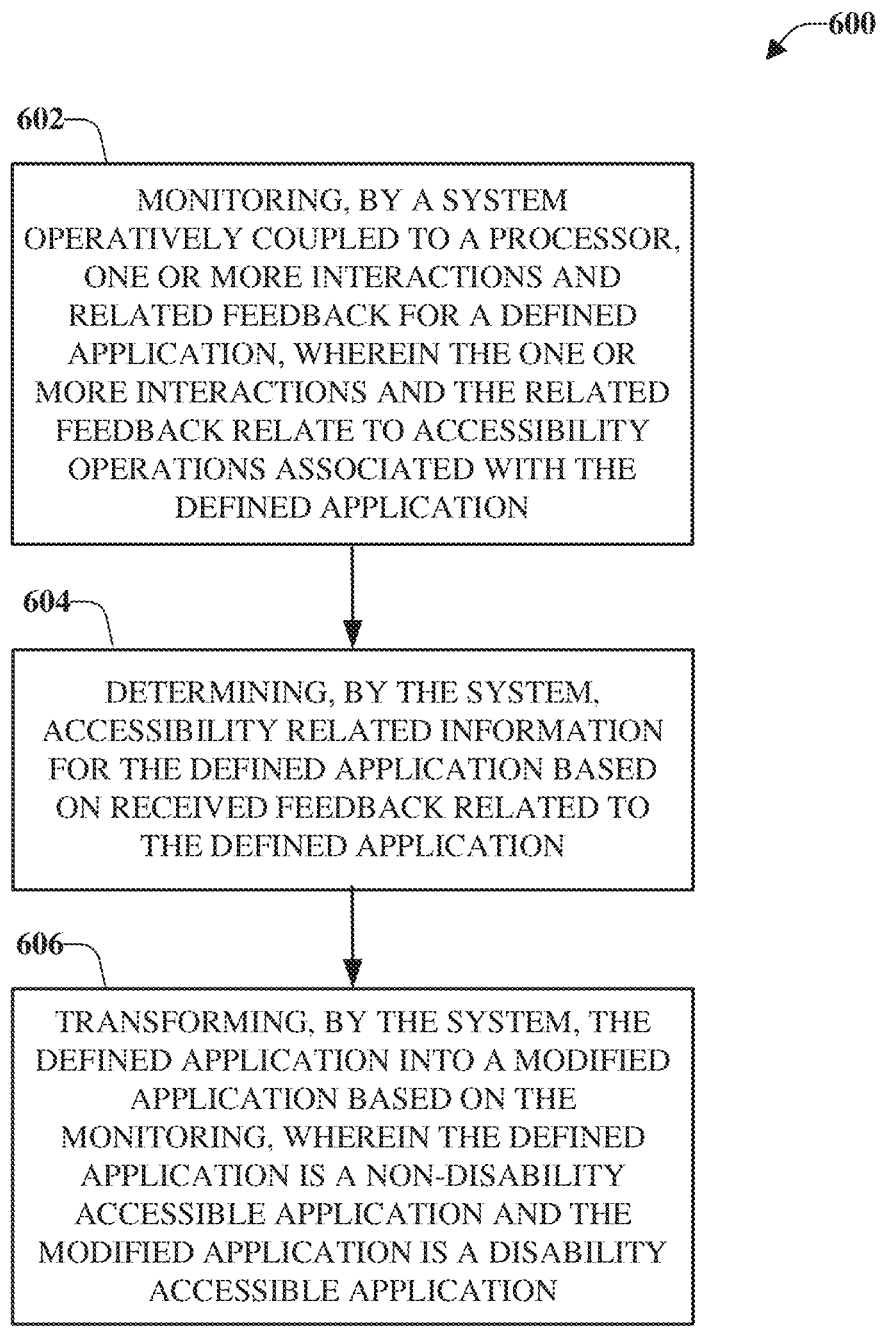
FIG. 6 illustrates a flow diagram of an example, non-limiting computer-implemented method that can render a non-disability accessible application in a disability accessible format in accordance with one or more embodiments described herein.

FIG. 6 illustrates a flow diagram of an example, non-limiting computer-implemented method 600 that can render a non-disability accessible application in a disability accessible format in accordance with one or more embodiments described herein. Repetitive description of like elements employed in other embodiments described herein is omitted for sake of brevity.

At 602, the computer-implemented method 600 can comprise monitoring one or more interactions and related feedback for a defined application (e.g., via the interaction component 102). The one or more interactions and the related feedback can relate to accessibility operations associated with the defined application.

Accessibility related information can be determined, at 604 of the computer-implemented method 600, for the defined application based on received feedback related to the defined application (e.g., via the analysis component 104). According to some implementations, determining the accessibility related information can comprise gathering, by the system, contextual information through crowd sourcing.

Further, at 606 of the computer-implemented method 600, the system can include transforming the defined application into a modified application based on the monitoring (e.g., via the adjustment component 106). The defined application can be a non-disability accessible application and the modified application can be a disability accessible application.

In accordance with some implementations, transforming the defined application can comprise using, by the system, a non-intrusive form to transform the defined application. Further to these implementations, the defined application does not change.

In some implementations, transforming the defined application can comprise attaching, by the system, a proxy server to the defined application. In an alternative, or additional, implementation, transforming the defined application can comprise manipulating, by the system, a rendered hypertext markup language page of the defined application during run time based on a browser plug-in.

Figure 7:
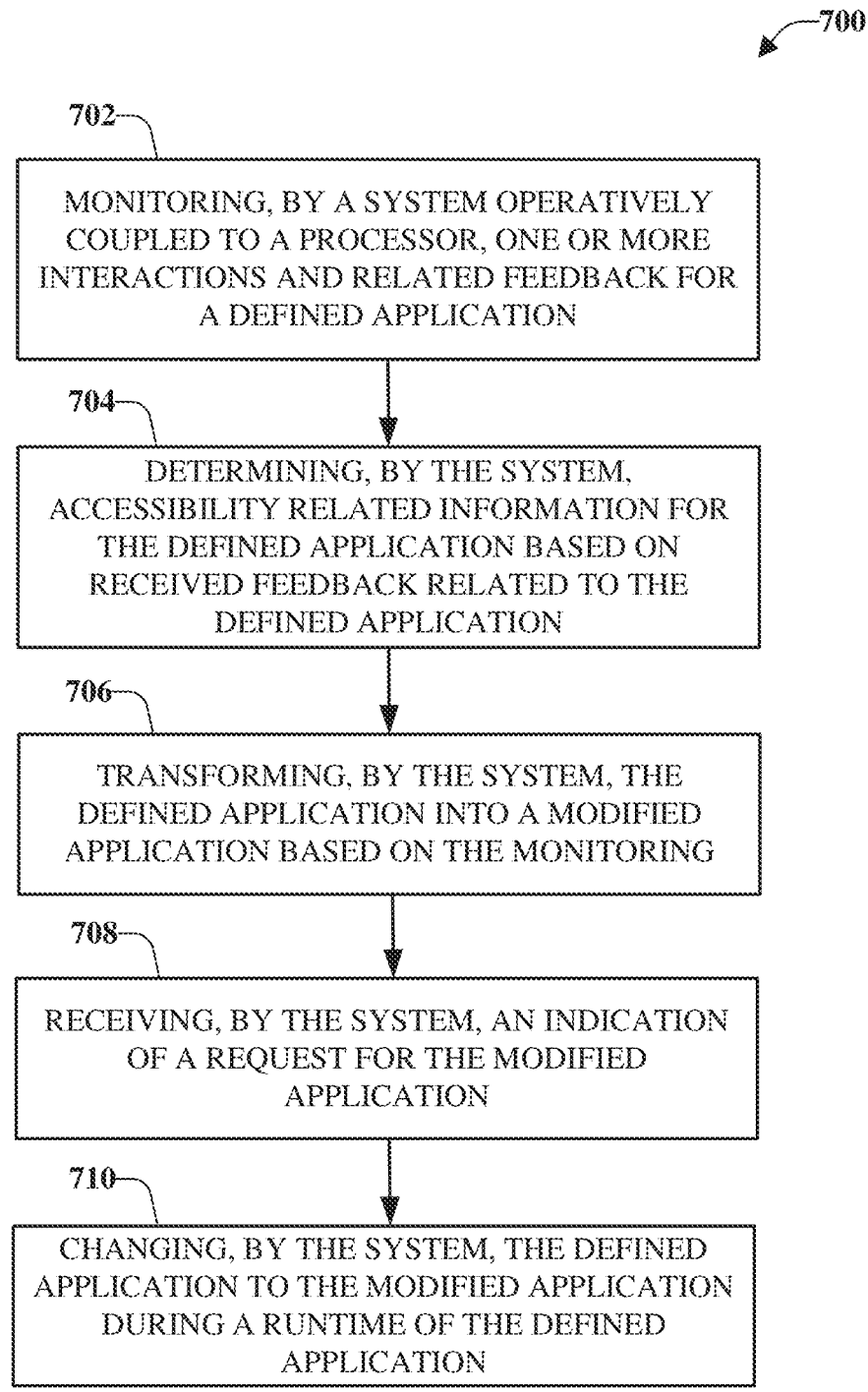
FIG. 7 illustrates a flow diagram of an example, non-limiting computer-implemented method that can transform an application into a disability accessible application upon or after a request for the application is received in accordance with one or more embodiments described herein.

FIG. 7 illustrates a flow diagram of an example, non-limiting, computer-implemented method 700 that can transform an application into a disability accessible application upon or after a request for the application is received in accordance with one or more embodiments described herein. Repetitive description of like elements employed in other embodiments described herein is omitted for sake of brevity.

A system operatively coupled to a processor can monitor one or more interactions and related feedback for a defined application, at 702 of the computer-implemented method 700 (e.g., via the interaction component 102). According to some implementations, monitoring the one or more interactions can comprise monitoring, by the system, interactions selected from a group comprising a navigation within the defined application, a behavior associated with the defined application, and/or an external action associated with the defined application.

At 704 of the computer-implemented method 700, the system can determine accessibility related information for the defined application based on received feedback related to the defined application (e.g., via the analysis component 104).

Further, at 706 of the computer-implemented method 700, the system can transform the defined application into a modified application based on the monitoring (e.g., via the adjustment component 106). For example, to transform the defined application, the computer-implemented method 700 can include receiving, at 708, an indication of a request for the modified application (e.g., via the interface component 202). Further to this example, at 710 of the computer-implemented method 700, the system can change the defined application to the modified application during a runtime of the defined application (e.g., via the adjustment component 106).

Figure 8:
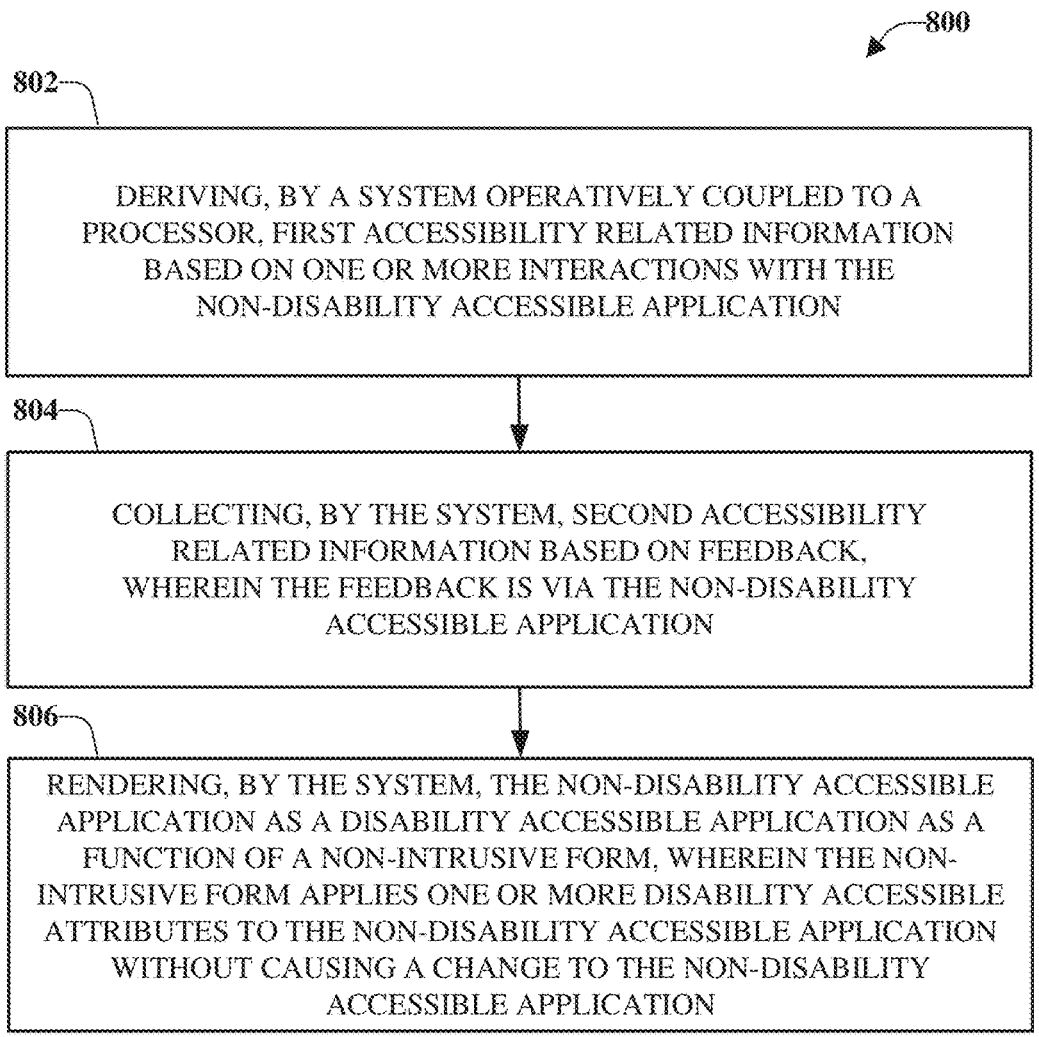
FIG. 8 illustrates an example, non-limiting computer-implemented method that renders an application in a disability accessible format based on a non-intrusive form in accordance with one or more embodiments described herein.

FIG. 8 illustrates an example, non-limiting computer-implemented method 800 that renders an application in a disability accessible format based on a non-intrusive form in accordance with one or more embodiments described herein. Repetitive description of like elements employed in other embodiments described herein is omitted for sake of brevity.

The computer-implemented method 800 starts, at 802, when a system operatively coupled to a processor derives first accessibility related information based on one or more interactions with the non-disability accessible application (e.g., via the interaction component 102).

At 804 of the computer-implemented method 800, the system can collect second accessibility related information based on feedback (e.g., via the interaction component 102). According to some implementations, the feedback can be via the non-disability accessible application.

Further, at 806 of the computer-implemented method 800, the system can render the non-disability accessible application as a disability accessible application as a function of a non-intrusive form (e.g., via the adjustment component 106). The non-intrusive form can apply one or more disability accessible attributes to the non-disability accessible application without causing a change to the non-disability accessible application.

According to some implementations, the computer-implemented method 800 can include attaching, by the system, a proxy server to the non-disability accessible application. The proxy server can facilitate application of the non-intrusive form.

In accordance with some implementations, the computer-implemented method 800 can include manipulating, by the system, a rendered hypertext markup language page of the non-disability accessible application at runtime based on a browser plug-in applied to the non-disability accessible application.

Figure 9:
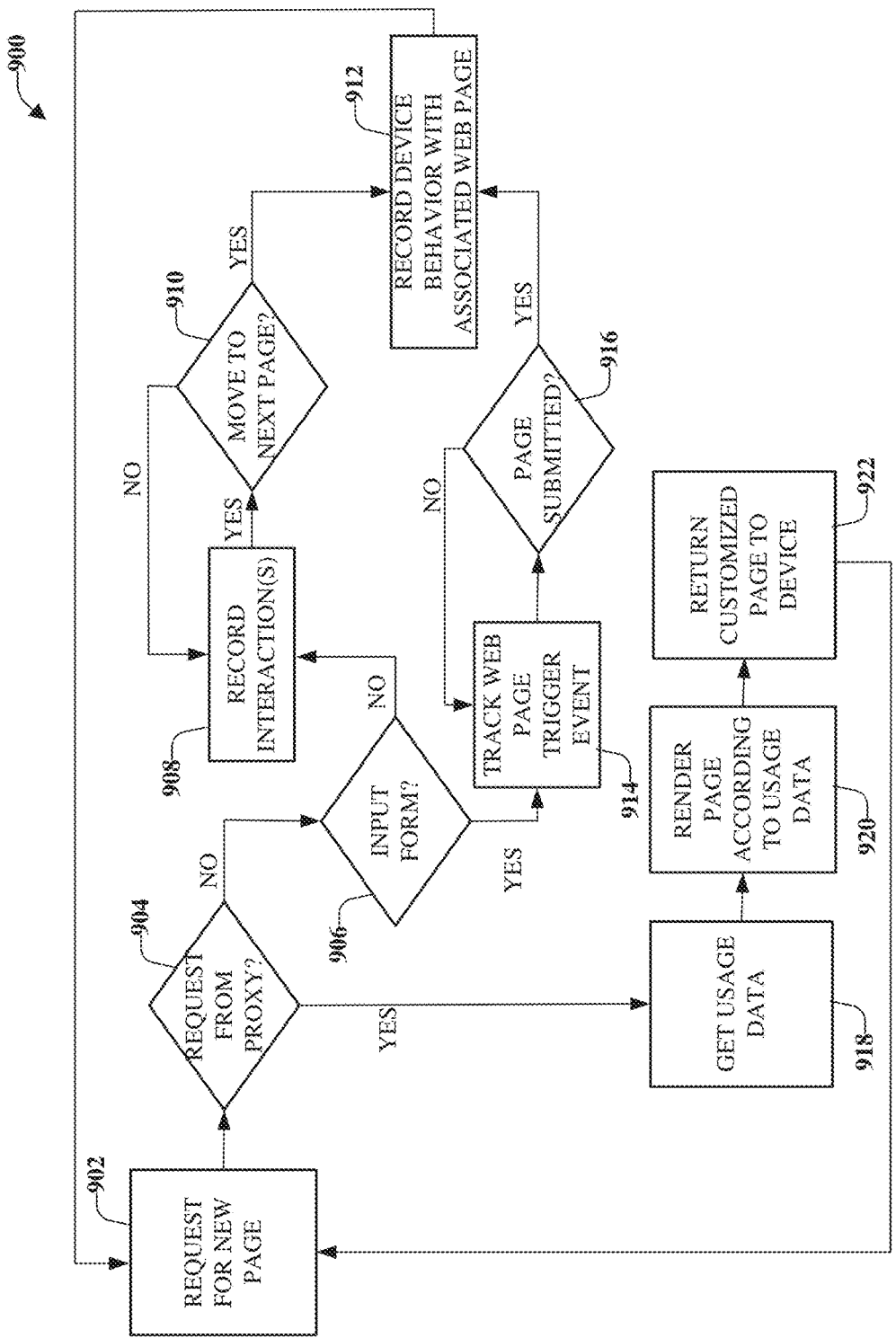
FIG. 9 illustrates an example, non-limiting computer-implemented method that facilitates rendering of a disability accessible web page in accordance with one or more embodiments described herein.

FIG. 9 illustrates an example, non-limiting computer-implemented method 900 that facilitates rendering of a disability accessible web page in accordance with one or more embodiments described herein. Repetitive description of like elements employed in other embodiments described herein is omitted for sake of brevity.

The computer-implemented method 900 starts, at 902, when information from a device indicating that a request for a new page is received (e.g., via the interface component 202). Based on the request, at 904, a determination can be made whether the page should be requested from a proxy (e.g., via the analysis component 104). For example, the determination whether the page should be requested from the proxy can include a determination whether the page should be rendered in a disability accessible format. If the page should not be requested from a proxy ("NO"), at 906, a determination can be made whether the form should be input (e.g., via the processor component) 108. If the form should not be input ("NO"), at 908 one or more interactions with the form can be recorded (e.g., via the interaction component 102). For example, screen scroll operations can be recorded. In another example, an eyeball tracker can be utilized to record a read order. A determination can be made, at 910, whether the page should be moved to a next page. If not ("NO"), interactions with the page can continue to be monitored at 908 (e.g., via the interaction component 102).

However, if the determination at 910 is that the page should be moved to a next page, at 912, user behaviors associated with an interaction between the device the associated webpage can be recorded (e.g., via the interaction component 102 and/or the storage 112). The computer-implemented method 900 can return to 902 to wait for another request for a page.

If the determination at 906 was that the form should be input, at 914 of the computer-implemented method 900, a web page trigger event can be tracked (e.g., via the feedback solicitation component 302). The web page trigger event can be whether a page is submitted, as determined, at 916 (e.g., via the evaluation component 304). If the page is not submitted ("NO"), the computer-implemented method 900 can continue to track for a web page trigger event at 914 (e.g., via the feedback solicitation component 302). However, if the page is submitted at 916 ("YES"), the computer-implemented method 900 can record device behavior associated with the associated webpage, at 912 (e.g. via the interaction component 102 and/or the storage 112). Thereafter, the computer-implemented method 900 can return to 902 to wait for another request for a page.

Alternatively, if the determination at 904 is that the request from the proxy should occur ("YES)", at 918, usage data can be obtained (e.g., via the analysis component 104). Upon or after obtaining the usage data, at 920, the page can be rendered according to the data (e.g., via the adjustment component 106). At 922, a customized page (e.g., a disability accessible page) can be returned to the device associated with the user (e.g., via the interface component). Upon or after returning the customized page to the device, the computer-implemented method 900 can return to 902 to wait for another request for a page.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
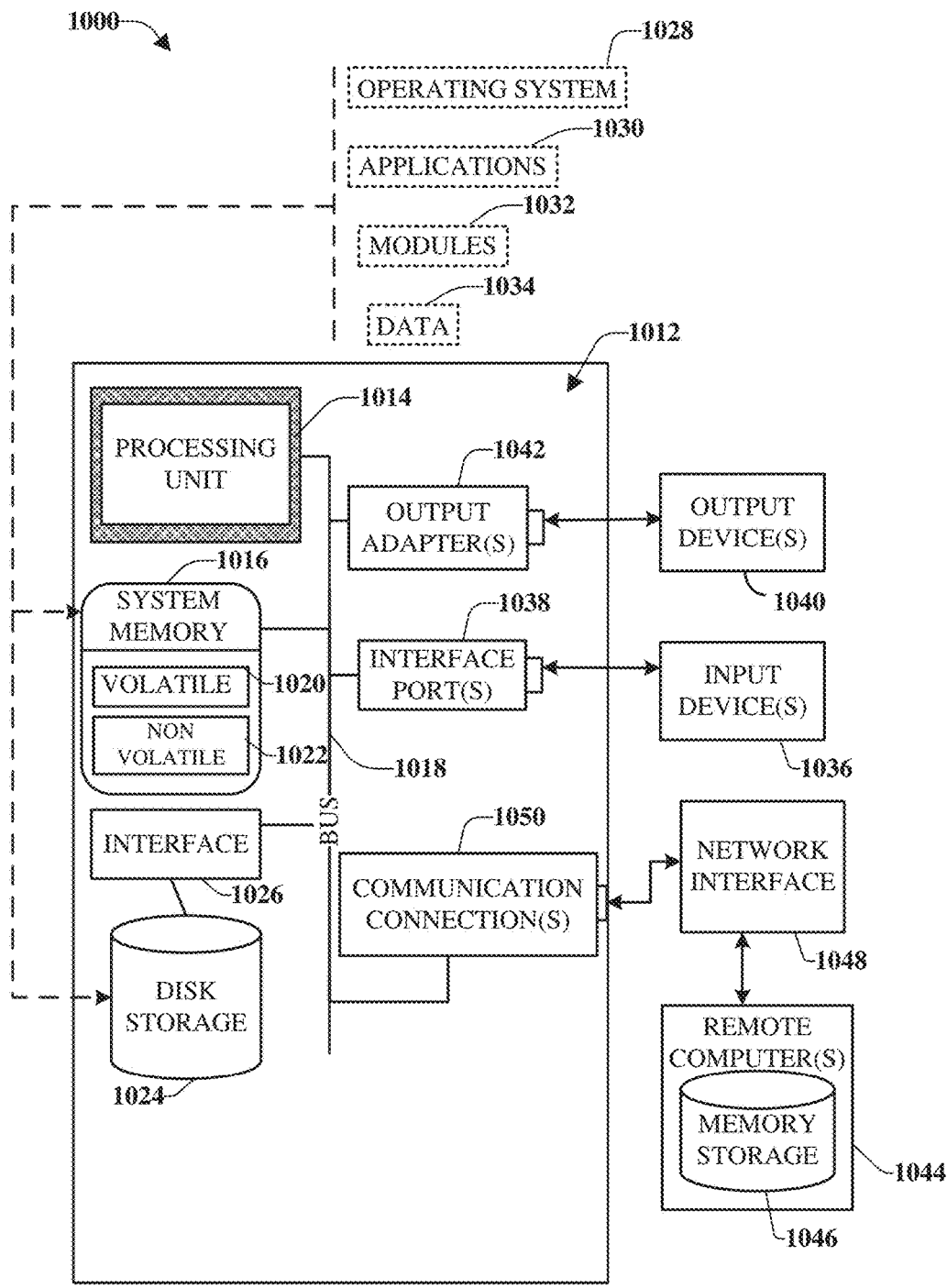
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard systems that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
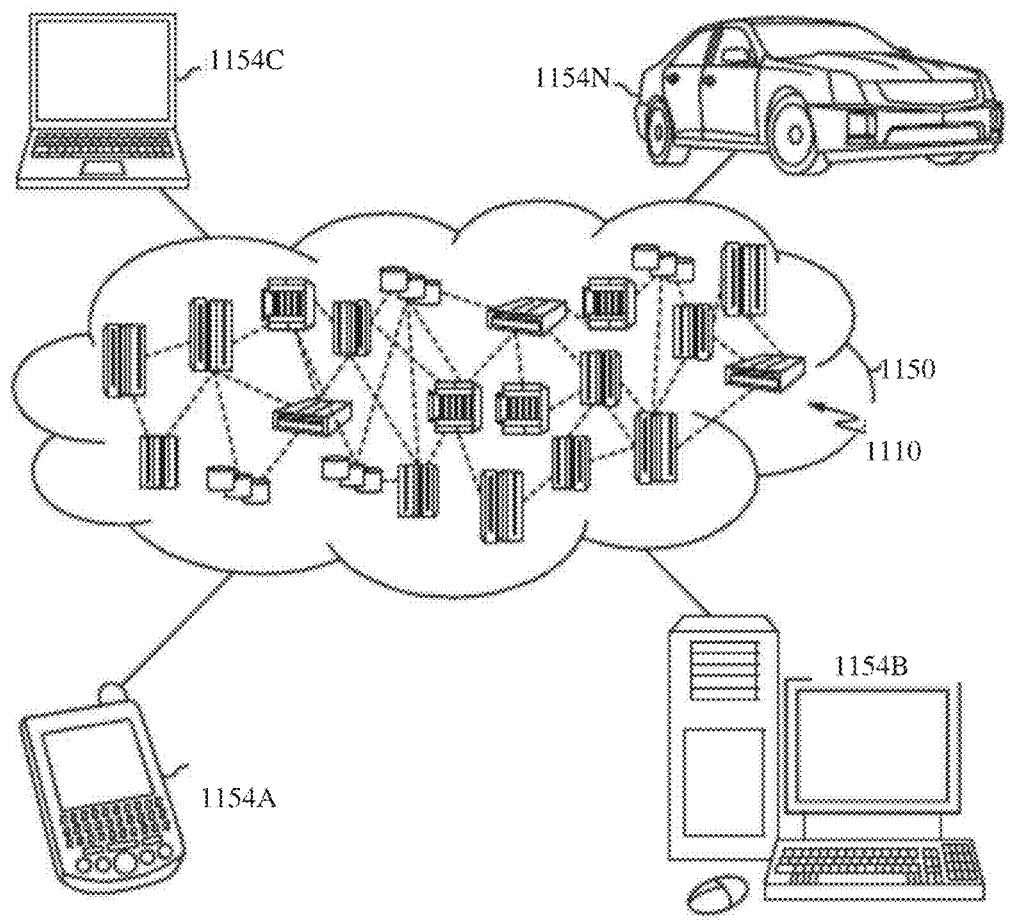
FIG. 11 depicts a cloud computing environment in accordance with one or more embodiments described herein.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
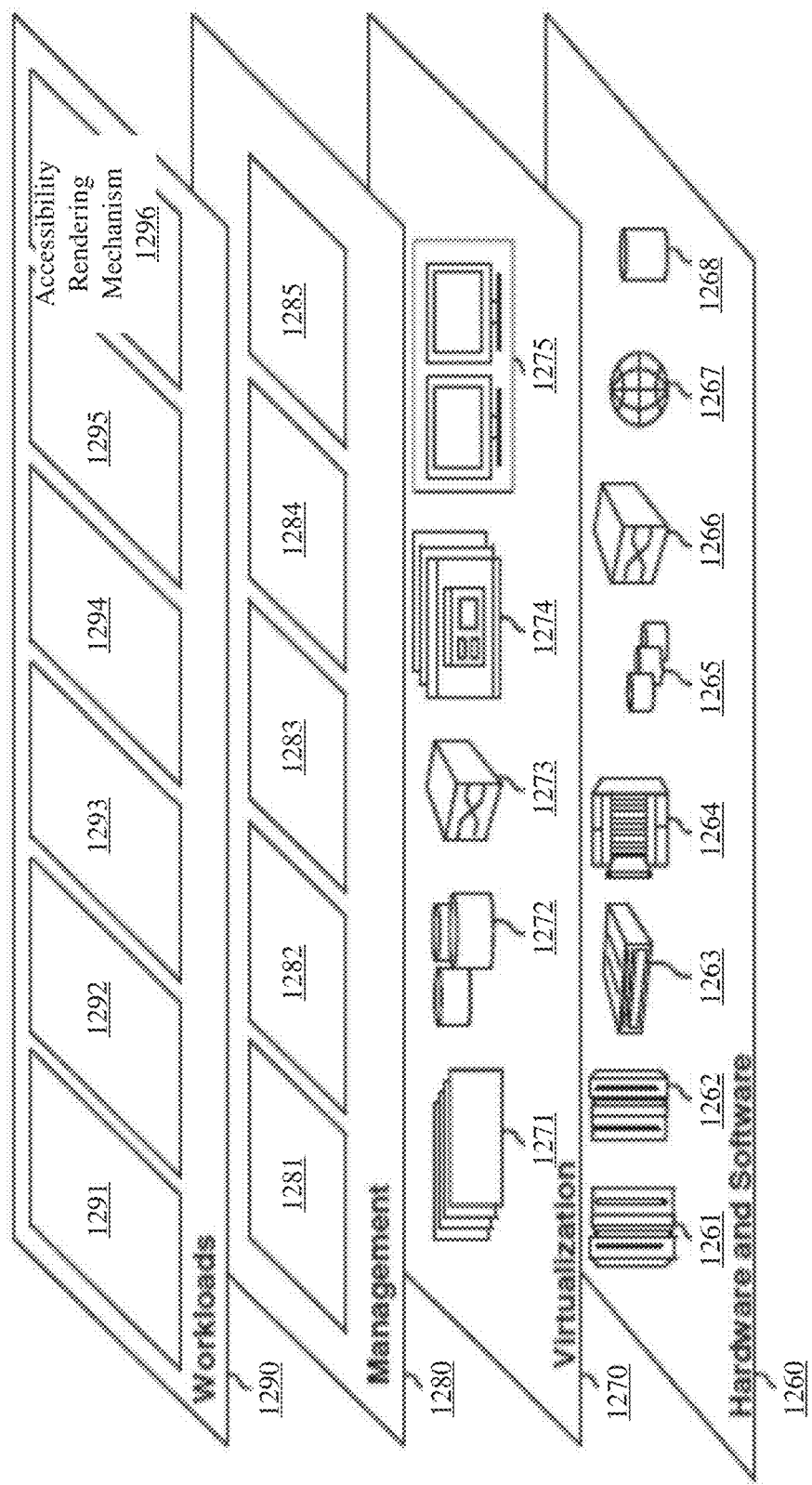
FIG. 12 depicts abstraction model layers in accordance with one or more embodiments described herein.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided: Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, the procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and accessibility rendering system 1296.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
    a memory that stores computer executable components; and
    a processor that executes the computer executable components stored in the memory, wherein the computer executable components comprise:
        an interaction component that monitors interactions between a plurality of entities and a defined application;

an arrangement component that analyzes the interactions to identify a common sequence of user interface elements of a user interface of the defined application that were navigated by a subset of the plurality of entities;
an analysis component that determines accessibility related information associated with the defined application based on received feedback information from at least one entity of the plurality of entities; and
an adjustment component that creates a modified application based on the one or more interactions and the accessibility related information of the defined application, wherein at least a portion of the modified application directs navigation through the common sequence of user interface elements of the user interface for disability access, the defined application is a non-disability accessible application and the modified application is a disability accessible application.

2. The system of claim 1, wherein the adjustment component creates the modified application through use of a non-intrusive form, wherein application code within the non-intrusive form is updated in real-time, and wherein the creation of the modified application increases a processing efficiency of a device that requested the modified application.

3. The system of claim 1, wherein the defined application is not changed by the adjustment component when the modified application is created.

4. The system of claim 1, wherein the interactions monitored by the interaction component comprise interactions selected from a group comprising a navigation within the defined application, a behavior associated with the defined application, and an external action associated with the defined application.

5. The system of claim 1, wherein the at least the portion of the modified application masks at least one user interface element of the user interface that is not part of the common sequence of user interface elements of the user interface.

6. The system of claim 1, wherein the analysis component determines information to include in the defined application to create the modified application that comprises accessibility support.

7. The system of claim 6, wherein the computer executable components further comprise:
a feedback solicitation component that appends feedback collection entry points within the defined application, wherein the at least one entity provides the feedback information based on an interaction with the defined application through the feedback collection entry points.

8. The system of claim 7, wherein the computer executable components further comprise:
an evaluation component that derives the accessibility related information based on the feedback information; and
an insertion component that appends an attribute to the user interface associated with the modified application, wherein the attribute is selected from a group of attributes comprising a label of an input field and an alternative text string of an image.

9. The system of claim 1, wherein the adjustment component attaches a proxy server to the defined application to render the modified application.

10. The system of claim 1, wherein the adjustment component implements a browser plug-in that manipulates a rendered hypertext mark-up language page of the defined application at run time.

11. A computer-implemented method, comprising:
monitoring, by a system operatively coupled to a processor, interactions between a plurality of entities and a defined application;
analyzing, by the system, the interactions to identify a common sequence of user interface elements of a user interface of the defined application that were navigated by a subset of the plurality of entities;
determining, by the system, accessibility related information associated with the defined application based on received feedback information from at least one entity of the plurality of entities; and
creating, by the system, a modified application based on the one or more interactions and the accessibility related information of the defined application, wherein at least a portion of the modified application directs navigation through the common sequence of user interface elements of the user interface for disability access, the defined application is a non-disability accessible application and the modified application is a disability accessible application.

12. The computer-implemented method of claim 11, further comprising creating, by the system, the modified application through use of a non-intrusive form, wherein application code within the non-intrusive form is updated in real-time.

13. The computer-implemented method of claim 11, wherein the defined application is not changed during the creating the modified application, and wherein the creating the modified application comprises increasing a processing efficiency of a device that requested the modified application.

14. The computer-implemented method of claim 11, wherein the monitoring the interactions comprises monitoring, by the system, the interactions selected from a group comprising a navigation within the defined application, a behavior associated with the defined application, and an external action associated with the defined application.

15. The computer-implemented method of claim 11, wherein the at least the portion of the modified application masks at least one user interface element of the user interface that is not part of the common sequence of user interface elements of the user interface.

16. The computer-implemented method of claim 11, further comprising determining information to include in the defined application to create the modified application that comprises accessibility support.

17. The computer-implemented method of claim 11, further comprising:
appending, by the system, feedback collection entry points within the defined application, wherein the at least one entity provides the feedback information based on an interaction with the defined application through the feedback collection entry points.

18. A computer program product that facilitates rendering a non-disability accessible application in a disability accessible format, the computer program product comprising a computer readable storage medium having program instructions embodied therewith, the program instructions are executable by a processor to cause the processor to:
monitor interactions between a plurality of entities and a defined application;

analyze the interactions to identify a common sequence of user interface elements of a user interface of the defined application that were navigated by a subset of the plurality of entities;

determine accessibility related information associated with the defined application based on received feedback information from at least one entity of the plurality of entities; and create a modified application based on the one or more interactions and the accessibility related information of the defined application, wherein at least a portion of the modified application directs navigation through the common sequence of user interface elements of the user interface for disability access, the defined application is the non-disability accessible application and the modified application is a disability accessible application.

19. The computer program product of claim 18, wherein the program instructions cause the processor to:

create the modified application through use of a non-intrusive form, wherein application code within the non-intrusive form is updated in real-time.

20. The computer program product of claim 18, wherein the at least a portion of the modified application masks at least one user interface element of the user interface that is not part of the common sequence of user interface elements of the user interface.

* * * * *